United States Patent [19]

Mori et al.

[11] Patent Number: 4,887,245

[45] Date of Patent: Dec. 12, 1989

[54] COORDINATES INPUT APPARATUS

[75] Inventors: Shigeki Mori; Katsuyuki Kobayashi; Shinnosuke Taniishi, all of Tokyo; Kousuke Yamamoto, Yokohama, all of Japan

[73] Assignee: Canon Kabushiki Kaisha, Tokyo, Japan

[21] Appl. No.: 177,423

[22] Filed: Apr. 1, 1988

[30] Foreign Application Priority Data

Apr. 6, 1987 [JP] Japan .................................. 62-82897
Jul. 1, 1987 [JP] Japan .................................. 62-162400
Jul. 21, 1987 [JP] Japan .................................. 62-179991

[51] Int. Cl.$^4$ ............................................. G08C 21/00
[52] U.S. Cl. .................................... 367/129; 367/907; 178/18
[58] Field of Search ...................... 367/907, 129, 173; 181/400, 401; 178/18

[56] References Cited

U.S. PATENT DOCUMENTS

3,857,022 12/1974 Rebane et al. ...................... 367/907
4,286,470 9/1981 Lynnworth ...................... 73/861.18
4,454,767 6/1984 Shinkai et al. ...................... 73/861.18

Primary Examiner—Thomas H. Tarcza
Assistant Examiner—Daniel T. Pihulic
Attorney, Agent, or Firm—Fitzpatrick, Cella, Harper & Scinto

[57] ABSTRACT

A vibration which is input to a vibration propagating plate by a vibration pen is detected by vibration sensors attached at corner positions of the plate. This vibration is propagated as elastic waves in the vibration propagating plate and reaches the sensors. The coordinates of the vibration input point are calculated on the basis of the vibration propagating times corresponding to the detection signals from the sensors. The vibration sensors are come into pressure contact with the vibration propagating plate through a fluid like a grease having a high viscosity or consistency. Since such a fluid is filled in the space which is formed between the pressure contacting surfaces of the vibrator and vibration propagating plate, their coupling states are stable and the vibration and coordinates detecting characteristics can be uniformed every product.

7 Claims, 8 Drawing Sheets

COORDINATES INPUT APPARATUS

BACKGROUND OF THE INVENTION

1. Field of the Invention

The present invention relates to a coordinates input apparatus and, more particularly, to a coordinates input apparatus in which a vibration which is input from a vibration pen to a vibration propagating plate is detected by vibration sensors attached to the vibration propagating plate and the coordinates of the vibration input point of the vibration pen are detected.

2. Related Background Art

Hitherto, as an apparatus for inputting hand written characters, figures, or the like to a processing apparatus such as a computer, various kinds of coordinates input apparatuses using an input pen, tablet, or the like have been known. According to such a kind of system, image information consisting of input characters, figures, or the like is output to a display device such as a CRT display or a recording apparatus such as a printer.

In this kind of apparatus, the supersonic vibration which is propagated from the vibration input pen to the tablet is input to the vibration propagating plate and detected by the vibration sensors attached to predetermined portions on the vibration propagating plate which are away from the input point. The coordinates of the input point are determined on the basis of the vibration propagation times to the respective sensors.

According to such a system using the supersonic vibration, the input tablet can be made of a transparent material such as acrylic plate, glass plate, or the like. Therefore, it is possible to construct an information input/output apparatus in which the input tablet is overlaid onto a liquid crystal display device or the like and which can be used with a good operating feeling such that an image is written onto a paper.

In the above coordinates input apparatus, piezoelectric device or the like is used as an electric/mechanical or mechanical/electric converting device constituting a vibrator or vibration sensors.

Such a vibration converting device is fixed to the vibration propagating plate of the tablet or a member such as a horn at the tip of the vibration pen by adhering or pressure contacting or the like. When the vibration converting device is fixed by the adhering method, there are problems such that the vibration propagating characteristic changes due to an adhesive agent, a variation in vibration propagating characteristic occurs in dependence on an amount of deposition of the adhesive agent, and the like.

Figure 4:
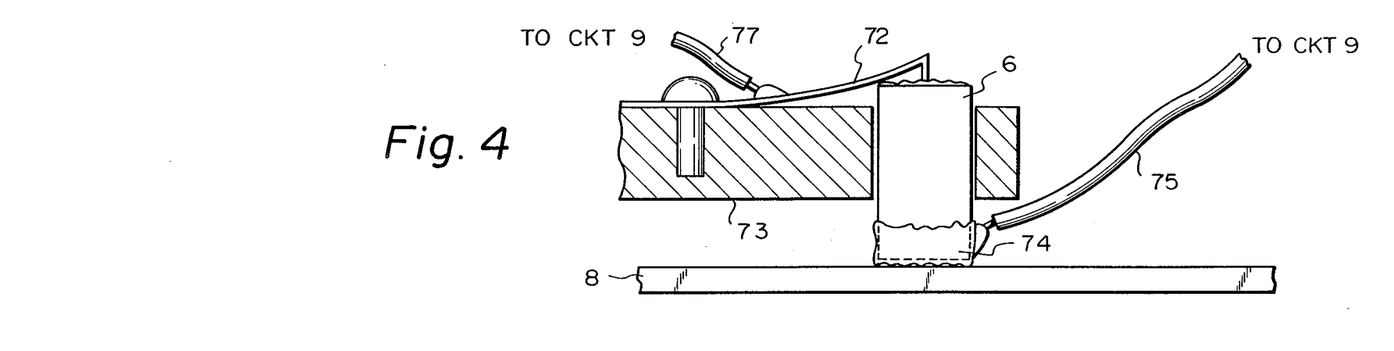
FIG. 4 is an explanatory diagram showing a conventional coupling structure between a vibration sensor and a vibration propagating plate.

In the case of fixing the vibration converting divice by the pressure contacting method using a spring or the like, such a problem of the large variation in vibration propagating characteristic does not occur. However, because of the roughness or the like of the edge surface of the device, an air layer is formed between the device edge surface and the surface onto which the device is come into pressure contact. Even if the pressure contacting conditions are properly adjusted, a variation still occurs in the vibration propagating characteristic. In particular, since an electrode is attached to the edge surface of the coverting device, in the case of a structure such that a conductive member made of silver or the like is adhered as shown in FIG. 4, it is difficult to set the shape of the edge surface to be constant. Thus, the variation in vibration porpagating characteristic increases.

Therefore, according to the system in which the vibration detection timing is decided on the basis of the waveform process and the coordinates are calculated, there are problems such that differences occur among the detection coordinates values and a constant coordinates detection accuracy cannot be assured every product.

The change in vibration propagating characteristic occurs in the pressure contacting portion of the vibrator of the vibration pen and in the pressure contacting portions among the vibration propagating plate of the tablet and the vibration sensors. Therefore, even if a variation in vibration propagating characteristic which occurs in each portion is small, a fairly large variation in characteristic eventually occurs.

Further, the vibration propagating plate such as metal plate, glass, plastics, or the like is used as the tablet. The mechanical/electric or electric/mechanical converting device such as a piezo-electric device or the like is used as a vibration sensor which is attached to the tablet or as a supersonic vibrator which is attached to the input pen.

Particularly, the vibrator attached to the input pen propagates the supersonic vibration to the vibration propagating plate of the tablet through the vibration propagating member such as a horn. On the other hand, to give a drive signal to the vibrator, a signal line needs to be connected to the electrode of the device. In this case, hitherto, a lead wire is soldered to the electrode of the device.

However, there is a problem such that the characteristic of the vibrator changes due to a solder which is used to connect the lead wire to the electrode. That is, in order to improve the vibration propagating characteristic, the vibrator is designed and manufactured so as to have a predetermined resonant characteristic. However, when the solder is deposited to a part of the device, the physical vibrating characteristic changes, so that a desired vibration propagating characteristic cannot be obtained.

On the other hand, it is difficult to always accurately and uniformly solder every product at the proper attaching positions or with correct amounts of deposition of the solder, causing a problem such that the characteristics differ every input pen.

On the contrary, a method whereby after the solder was deposited to the vibrators, the characteristics of the devices are adjusted to obtain the uniform characteristics is also considered. However, it is considered that such adjusting works become extremely hard. This manufacturing method is improper in terms of high productivity.

SUMMARY OF THE INVENTION

It is the first object of the present invention to provide a coordinates input apparatus in which a fluid is filled into the space portion which is formed between pressure contacting surfaces of a vibrator and a vibration propagating member in dependence on a working state or the like, thereby uniforming the pressure contacting states between the vibrator and the vibration propagating member every product and enabling the vibration to be propagated without a variation.

The second object of the invention is to provide a coordinates input apparatus in which a vibration which is input to a vibration propagating plate by a vibrator is detected by vibration sensors and the coordinates of the vibration input point are detected, wherein an electric/mechanical or mechanical/electric converting device constituting the vibrator or vibration sensor is coupled with the vibration propagating plate through a fluid having a high viscosity or consistency.

The third object of the invention is to provide a coordinates input apparatus in which an electric/mechanical or mechanical/electric converting device constituting a vibrator or a vibration sensor is coupled with a vibration propagating plate through a fluid having a high viscosity, so that this device and the vibration propagating plate can be held in the stable coupling state and the stable vibration detecting characteristic and stable coordinates detecting characteristic can be held.

The fourth object of the invention is to provide a coordinates input apparatus in which a vibrator can be easily electrically connected to a driver and an additional material such as a solder or the like is not deposited to the vibrator, so that the vibrating characteristic of the vibrator can be uniformed.

DETAILED DESCRIPTION OF THE PREFERRED EMBODIMENTS

The present invention will be described in detail hereinbelow with respect to an embodiment by reference to the drawings.

Figure 1:
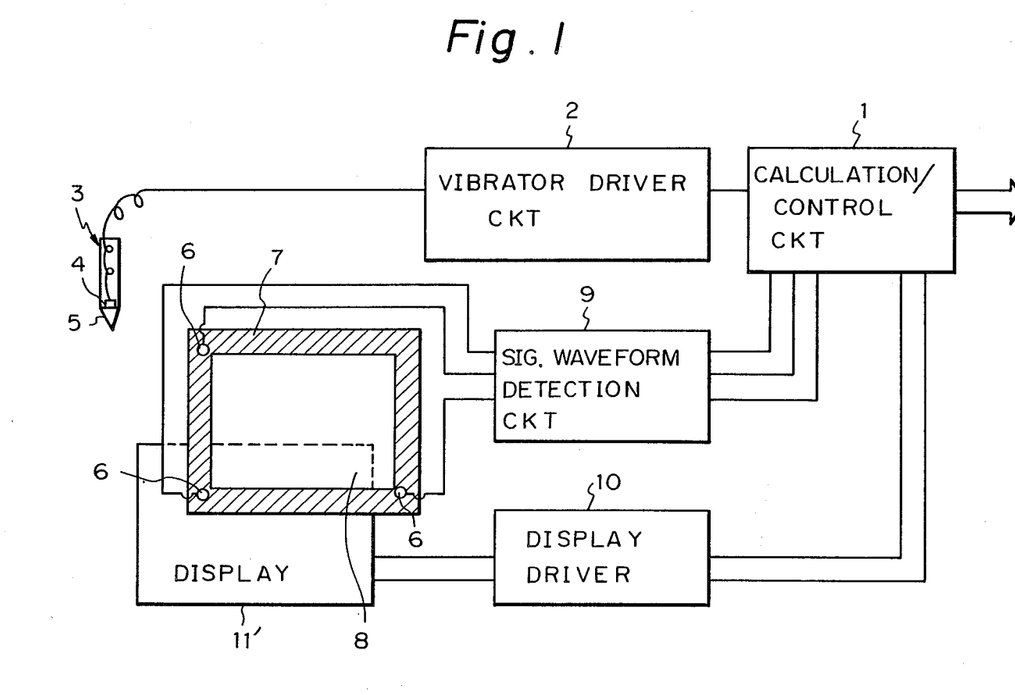
FIG. 1 is an explanatory diagram showing an arrangement of a coordinates input apparatus to which the present invention is applied.

FIG. 1 shows an arrangement of an information input/output apparatus to which the invention is applied. In the information input/output apparatus of FIG. 1, coordinates are input onto an input tablet consisting of a vibration propagating plate 8 by using a vibration pen 3. The input image is displayed onto a display 11' consisting of a CRT which is overlaid onto the input tablet on the basis of the input coordinates information.

In the diagram, the vibration propagating plate 8 is made of acrylic plate, glass plate, or the like. The vibration propagated by the vibration pen 3 is propagated to three vibration sensors 6 attached at three corner portions on the plate 8. In this embodiment, by measuring the propagation times of the supersonic vibrations which are propagated from the vibration pen 3 to the vibration sensors 6 through the vibration propagating plate 8, the coordinates on the plate 8 of the vibration pen 3 are detected.

The plate 8 is supported at the peripheral portions by a reflection preventing material 7 of silicon rubber or the like, thereby preventing that the vibration propagated from the vibration pen 3 is reflected by the peripheral portions and returned toward the central portion of the plate 8.

The vibration propagating plate 8 is arranged over the display 11' such as a CRT (or liquid crystal display or the like) which can display image data by dots, thereby displaying the dots at the position traced by the pen 3. That is, the dots are displayed at the position over the display 11' corresponding to the detected coordinates of the vibration pen 3. The image consisting of elements such as points, lines, and the like which are input by the vibration pen 3 appears after the locus of the vibration pen with a feeling such that the image is written onto a paper.

According to such a constitution, it is also possible to use an input system in which a menu is displayed on the display 11' and a desired item in the menu is selected by using the vibration pen, or a prompt is displayed and the vibration pen 3 is allowed to touch a predetermined position, or the like.

The vibration pen 3 to propagate the supersonic vibration to the vibration propagating plate 8 has therein a vibrator 4 consisting of a piezo-electric device or the like. The supersonic vibration generated by the vibrator 4 is propagated to the vibration propagating plate 8 through a horn 5 having a pointed tip.

Figure 2:
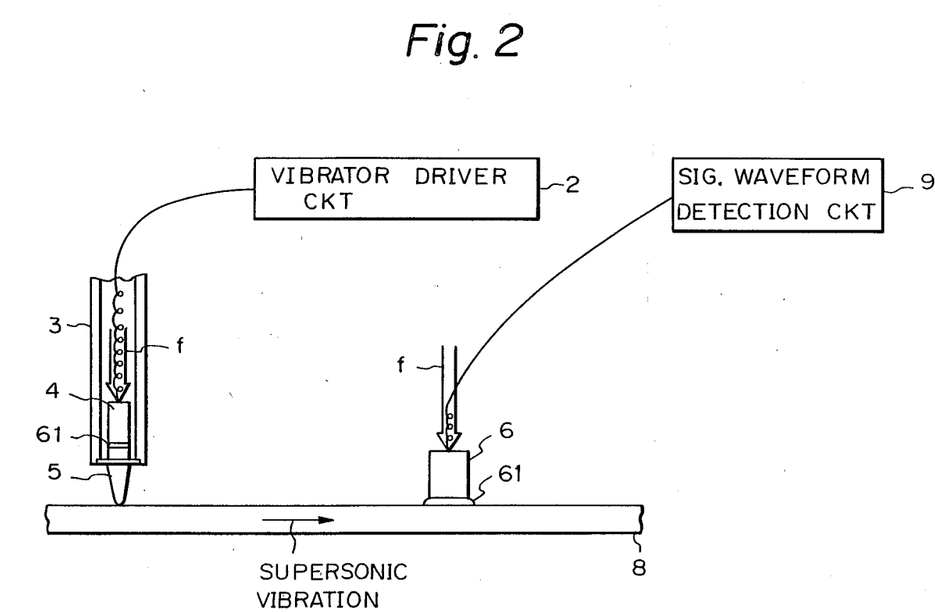
FIG. 2 is an explanatory diagram showing a structure of a vibration input/output section in FIG. 1.

FIG. 2 shows structures of the vibration pen 3 and vibration sensor 6.

The vibrator 4 assembled in the vibration pen 3 is driven by a vibrator driver 2. A drive signal of the vibrator 4 is supplied as a pulse signal of a low level from a calculation/control circuit 1 in FIG. 1. The drive signal is amplified by a predetermined gain by the vibrator driver 2 which can drive at a low impedance and thereafter, it is applied to the vibrator 4.

The electrical drive signal is converted into the mechanical supersonic vibration by the vibrator 4 and propagated to the vibration propagating plate 8 through the horn 5.

A vibrating frequency of the vibrator 4 is selected to such a value as to enable the vibration propagating plate 8 made of acrylic or glass plate or the like to generate plate waves. On the other hand, when the vibrator is driven, a vibrating mode is selected to such a mode that the vibrator 4 mainly vibrates in the vertical direction in FIG. 2 for the vibration propagating plate 8. On the other hand, by setting the vibrating frequency of the vibrator 4 to the resonant frequency thereof, the vibration conversion can be efficiently performed.

The elastic waves which are propagated to the plate 8 as mentioned above are the plate waves and have an advantage such that they are hardly influenced by the scratches on surface of the plate 8, obstacles, or the like as compared with the surface waves or the like.

On the other hand, the supersonic vibration which is propagated on the plate 8 is input to the vibration sensors 6 attached to the corner portions of the plate 8 and again converted into the electric signals. Outputs of the sensors 6 are input to a waveform detection circuit 9, which will be explained hereinafter, and waveform processed to detect the coordinates.

In this embodiment, the vibrator 4 of the vibration pen 3 and the vibration sensors 6 on the plate 8 are fixed by a pressure contacting method instead of adhesion.

The vibrator 4 of the vibration pen 3 is come into pressure contact with the rear edge portion of the horn 5 by a pressure contacting load f generated by a spring or the like. On the other hand, the vibration sensor 6 is also similarly come into pressure contact with the vibration propagating plate 8 by the pressure contacting load f by a spring or the like.

Figure 3:
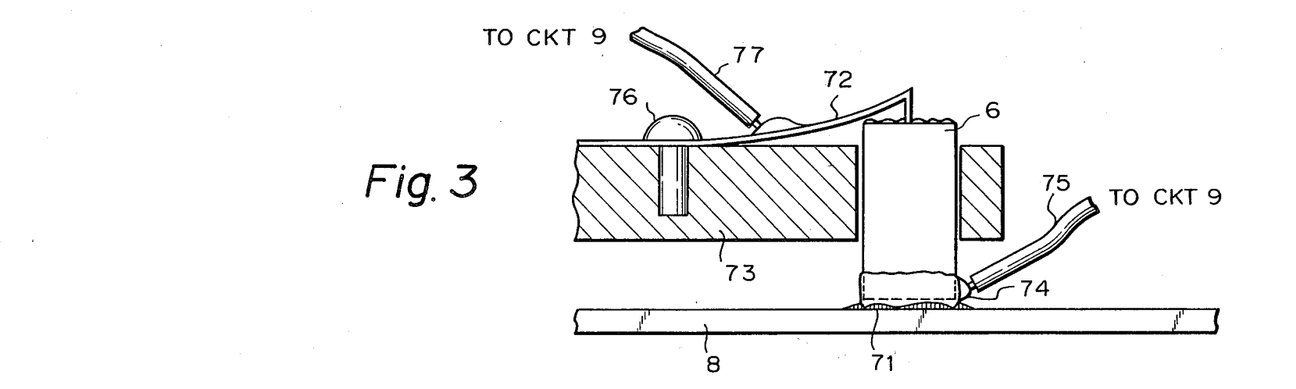
FIG. 3 is an explanatory diagram showing a structure of the coupling portion between a vibration sensor and a vibration propagating plate in the coordinates input apparatus according to the invention.

FIG. 3 shows an attaching structure of the vibration sensor to the vibration propagating plate in the coordinates input apparatus to which the invention is applied.

The embodiment of FIG. 3 differs from FIG. 4 with respect to the pressure contacting portions between the vibration sensor 6 and the vibration propagating plate 8. In this embodiment, the tip portion of the sensor 6 to which a lead wire 75 is fixed by a conductive member 74 made of silver is come into pressure contact with the plate 8 by an urging force of a pressure contact spring 72 through a fluid 71 having a high viscosity or consistency. The vibration sensor 6 consists of mechanical/electric converting means such as a piezo-electric device or the like.

For example, silicon grease or the like which is used to radiate the heat of a semiconductor can be used as the fluid 71.

As the grease 71, the grease having a coefficient of kinematic viscosity of about 10,000 to 1,000,000 [centistokes: cSt] (0.01 to 1 [m$^2$/sec]) or consistency of about 190 to 390 (JIS K2220) is used. When the vibrator 4 and vibration sensor 6 are come into pressure contact, the grease 71 is deposited onto their pressure contacting surfaces, thereby filling the grease 71 between the vibrator 4 and the horn 5 and between the vibration sensor 6 and the vibration propagating plate 8.

According to such a structure, the grease 71 is filled into the spaces which have conventionally been formed between the vibrator 4 and the horn 5 and between the vibration sensor 6 and the plate 8 due to the surface roughness, deformation, and the like of the pressure contacting surfaces. Thus, the substantial vibration propagating surfaces of them can be completely closely adhered without producing an air layer or the like. Therefore, the supersonic vibration can be efficiently propagated from the vibrator 4 to the horn 5 or from the plate 8 to the vibration sensors 6. The energy conversion can be efficiently executed. That is, a driving electric power of the vibrator 4 or the amplification factor after detection by the sensors 6 or the like can be reduced. The electric power consumption can be also decreased.

On the other hand, no variation occurs in adhering degree between the vibrator 4 and the horn 5 and between the sensor 6 and the plate 8 every product. Consequently, a variation in coordinates detecting accuracy in the coordinates detecting processes based on the waveform processes, which will be explained hereinafter, can be also eliminated. The members which are interposed between the pressure contacting surfaces of the vibrator 4 and horn 5 and between those of the sensor 6 and plate 8 are not limited to the grease. A compound having a consistency similar to the grease or other fluid having a high viscosity or consistency can be also used.

Figure 5:
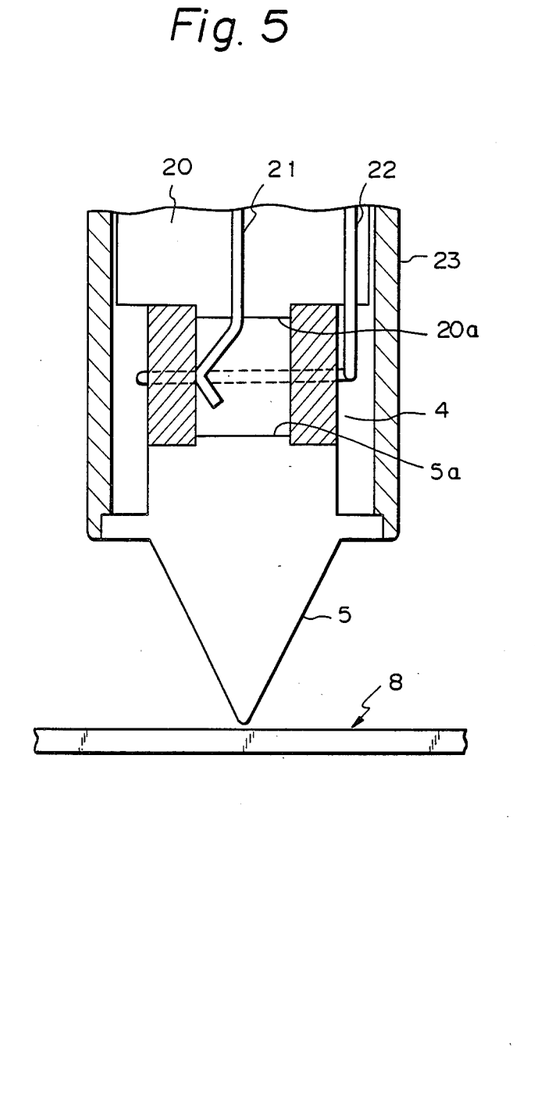
FIG. 5 is an explanatory diagram showing a structure of a vibration pen in FIG. 1.

FIG. 5 shows a structure of the vibration pen 3. The vibrator 4 assembled in the vibration pen 3 is driven by the vibrator driver 2. The drive signal of the vibrator 4 is supplied as a pulse signal of a low level from the calculation/control circuit 1 in FIG. 1. This drive signal is amplified by a predetermined gain by the vibrator driver 2 which can drive at a low impedance and thereafter, it is applied to the vibrator 4.

The elctrical drive signal is converted into the mechanical supersonic vibration by the vibrator 4 and propagated to the vibration propagating plate 8 through the horn 5.

The vibrator 4 in FIG. 5 is almost cylindrical and has a ring-shaped cross section. A projecting portion 20a having a circular cross section is formed in the lower portion of a supporting member 20 fitted into a pen axis 23. A projecting portion 5a having a circular cross section is formed in the rear end portion (i.e., the upper portion in the diagram) of the horn 5 in the pen axis 23. The vibrator 4 is supported by the projecting portions 20a and 5a.

Drive electrodes are attached to predetermined positions on the outer and inner peripheral surfaces of the cylindrical body of the vibrator 4 by coating the conductive members made of silver or the like. To give a drive signal to the drive electrodes, in this embodiment, elastic electrodes 21 and 22 are come into pressure contact as the drive electrodes of the vibrator 4 without using the conventional soldering method.

That is, the electrodes 21 and 22 are buried in the supporting member 20 of plastics or the like by a molding method or the like. The electrode 21 is come into pressure contact with the inner drive electrode of the vibrator 4. The electrode 22 is formed so as to surround the vibrator 4 like a ring and is come into pressure contact with the outer drive electrode of the vibrator 4. The electrodes 21 and 22 are coupled with a cable to connect to the driver in the rear portion of the pen or the like.

The polarization of the vibrator 4 is performed in both of the inside and outside of the cylinder. The piezo-electric lateral effect, that is, such a vibrating mode that the direction of the applied electric field which is formed by the drive electrodes provided in the inside and outside of the device is perpendicular to the displacement direction of the device is selected. Thus, when the vibrator is driven, the vibrator 4 mainly vibrates in the vertical direction in FIG. 2 with respect to the vibration propagating plate 8.

Further, a vibrating frequency of the vibrator 4 which is actuated by the vibrator driver 2 is set to a value such as to enable the vibration propagating plate 8 made of acrylic plate, glass plate, or the like to generate the plate waves. On the other hand, by setting the vibrating frequency of the vibrator 4 to the resonant frequency of the vibrator 4, the vibration conversion can be efficiently performed.

The elastic waves which are propagated to the plate 8 as mentioned above are the plate waves and have an advantage such that they are hardly influenced by scratches on the surface of the plate 8, obstacles, or the like as compared with the surface waves or the like.

In addition, according to the foregoing structure, by sandwiching the ring-shaped vibrator 4 by the electrodes 21 and 22 from the inside and outside of the vibrator 4, and further by positioning the vibrator 4 at a predetermined position in the pen by the projecting portions 20a and 5a of the supporting member 20 and horn 5, the vibrator 4 can be easily fixed in the pen and can be easily electrically connected to a necessary circuit.

On the other hand, since the circuit is not connected by soldering or the like, it is possible to prevent that the resonant characteristic of the vibrator 4 changes by the solder deposited to the device or that the resonant characteristic varies every pen.

Further, in the pressure contact structure of the electrodes as shown in FIG. 5, by making the electrodes 21 and 22 coming into contact with the position of the node of the vibration which is generated in the vibrator 4, the vibrating characteristic of the vibrator 4 can be made further stable. According to this structure, a variation in vibrating characteristic can be reduced as compared with the conventional method whereby the lead wire is soldered to the edge portion of the vibrator 4.

Therefore, the characteristics of the vibrations which are propagated to the vibration propagating plate 8 are uniformed. The waveforms of the vibration detection signal for coordinates detecting processes, which will be explained hereinafter, can be uniformed to constant waveforms and the coordinates detecting accuracy can be fairly improved.

The structure to make the electrodes come into pressure contact with the vibrator 4 is not limited to only the structure shown in FIG. 5 but the invention can be also applied to other structure in dependence on the vibrating characteristic of the device.

Figure 6:
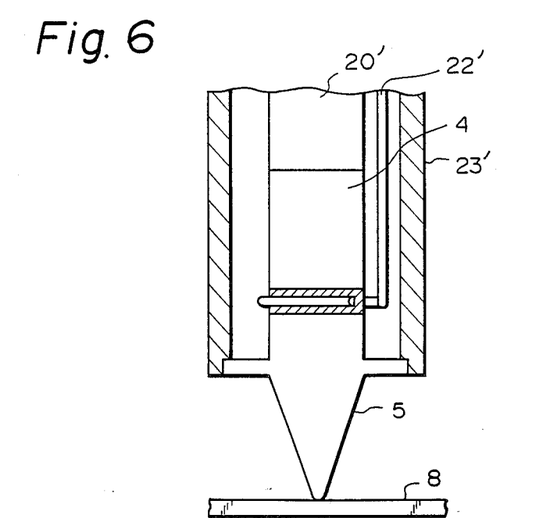
FIG. 6 is an explanatory diagram showing a different structure of the vibration pen.

FIG. 6 shows a structure in the case of using the vibrator 4 using the piezo-electric vertical effect instead of the vibrator 4 using the piezo-electric lateral effect as shown in FIG. 5.

In FIG. 6. the vibrator 4 is cylindrical and is polarized at both edge surfaces of the cylinder. The electrodes of the vibrator 4 are formed by coating conductive members made of silver or the like. The electrode at the lower edge surface is formed until the circumferential surface as indicated by an oblique line.

In the case of this embodiment, a supporting member 20' also serves an an electrode and is made of a conductive material and is come into pressure contact with the electrode at the upper edge surface of the vibrator 4. On the other hand, another electrode 22' extends from the rear portion of the pen so as not to come into contact with the supporting member 20'. The tip portion of the electrode 22' is molded so as to surround the outer peripheral surface of the vibrator 4 and is come into pressure contact with the electrode surface of the lower edge portion of the vibrator 4 which is extended to the outer peripheral surface of the vibrator 4 as shown in the hatched portion.

With this structure, there is no need to solder to the vibrator 4. Thus, the extremely stable vibration input characteristic can be obtained and the coordinates detecting accuracy can be improved.

Returning to FIG. 1, each of the vibration sensors 6 attached to the corner portion of the vibration propagating plate 8 also consist of the mechanical/electric converting device such as a piezo-electric device or the like. The output signals of the three vibration sensors 6 are input to the waveform detection circuit 6 and converted into the detection signals which can be processed by the calculation/control circuit 1 at the post stage. The calculation/control circuit 1 measures the vibration propagating times, thereby detecting the coordinates position on the plate 8 of the vibration pen 3.

The detected coordinates information of the vibration pen 3 are processed by the calculation/control circuit 1 in accordance with the output system of the display 11'. That is, the calculation/control circuit 1 controls the output operation of the display 11' through a display driver 10 on the basis of the input coordinates information.

Figure 7:
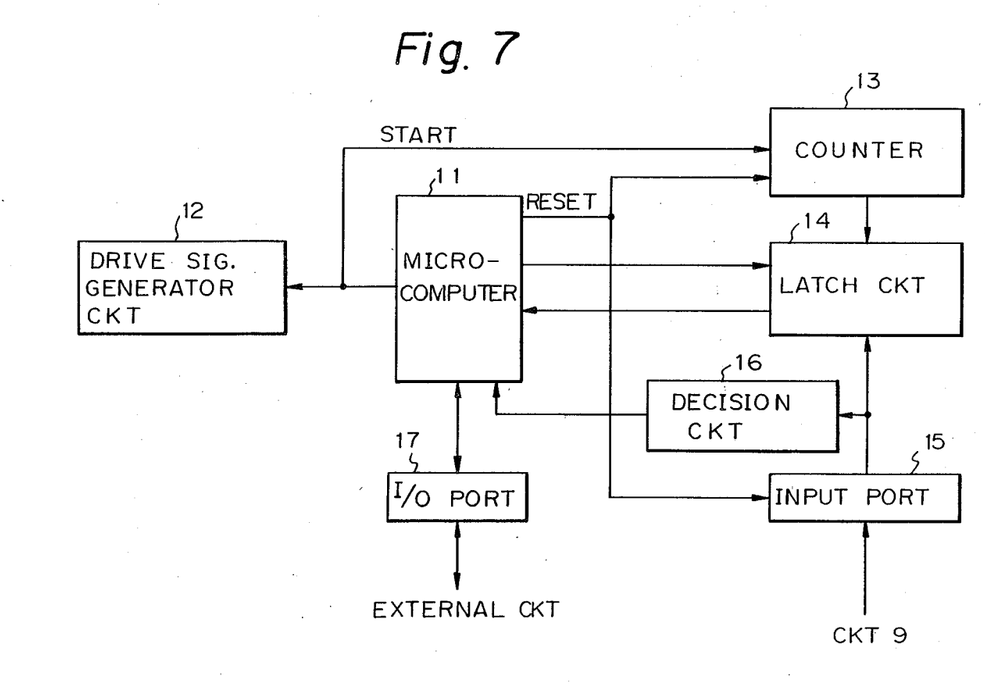
FIG. 7 is a block diagram showing an arrangement of a calculation/control circuit in FIG. 1.

FIG. 7 shows a structure of the calculation/control circuit 1 in FIG. 1 and mainly illustrates structures of a drive system of the vibration pen 3 and a vibration detecting system by the vibration sensors 6.

A microcomputer 11 has therein an internal counter, an ROM, and an RAM. A drive signal generator 12 outputs drive pulses of a predetermined frequency to the vibrator driver 2 in FIG. 1. The generator 12 is made operative by the microcomputer 11 synchronously with the circuit to calculate the coordinates.

A count value of a counter 13 is latched into a latch circuit 14 by the microcomputer 11.

On the other hand, the waveform detection circuit 9 outputs timing information of the detection signal to measure the vibration propagating times for detection of the coordinates from the outputs of the vibration sensors 6 in a manner as will be explained hereinafter. The timing information is input to an input port 15, respectively.

The timing signal from the waveform detection circuit 9 is input to the input port 15 and stored into a memory area corresponding to each vibration sensor 6 in the latch circuit 14. The resultant data is supplied to the microcomputer 11.

That is, the vibration propagating times are expressed as latch values of the output data of the counter 13. The coordinates are calculated by the values of the vibration propagating times. At this time, a decision circuit 16 discriminates whether all of the timing information of the waveform detection from a plurality of vibration sensors 6 have been input or not. The result of this discrimination is input to the microcomputer 11.

The output control processes of the display 11' are executed through an input/output port 17.

Figure 8:
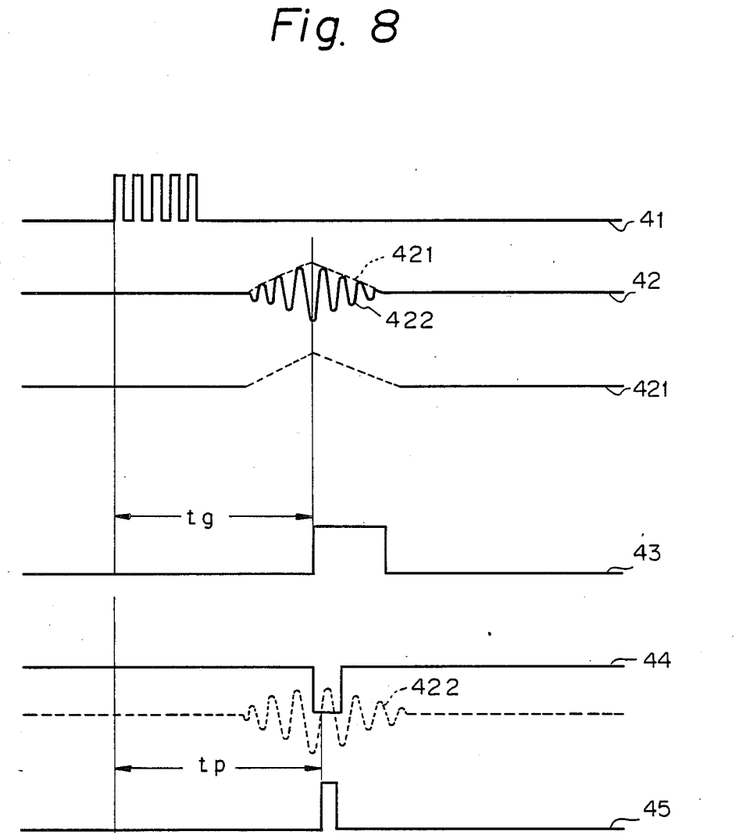
FIG. 8 is a waveform diagram showing detection waveforms for explaining the measurement of the distance between the vibration pen and the vibration sensor.

FIG. 8 is a diagram for explaining detection waveforms which are input to the waveform detection circuit 9 in FIG. 1 and the processes to calculate the vibration propagating times based on the input detection waveforms. In FIG. 8, drive signal pulses 41 are applied to the vibration pen 3. The supersonic vibration which is transferred to the plate 8 from the vibration pen 3 driven by the drive signal pulses having such waveforms is propagated in the plate 8 and detected by the vibration sensor 6.

After the vibration advanced in the plate 8 for a period of time $r_g$ corresponding to the distance to the vibration sensor 6, the vibration reaches the sensor 6. Reference numeral 42 in FIG. 8 denotes signal waveforms detected by the vibration sensor 6. Since the plate waveforms which are used in the embodiment are the dispersive waves, the relation between an envelope 421 and a phase 422 of the detection waveforms changes in accordance with the vibration propagation distance.

It is now assumed that a group velocity of the envelope is set to $V_g$ and a phase velocity thereof is set to $V_p$. The distance between the vibration pen 3 and the vibration sensor 6 can be detected from the difference between the group velocity and the phase velocity.

First, when an attention is paid to only the envelope 421, the group velocity is $V_g$. When a certain point on the waveform, e.g., the peak is detected as shown at reference numeral 43 in FIG. 8, the distance a between the vibration pen 3 and the vibration sensor 6 is obtained by $$d = V_g \cdot t_g \quad (1)$$

when the vibration propagating time assumes $t_g$. This equation relates to one of the vibration sensors 6. However, the distance between each of the other two vibration sensors 6 and the vibration pen 3 can be also derived by the same equation.

Further, to decide the coordinate values at a higher accuracy, the processes based on the detection of the phase signal are executed. Assuming that the period of time from a special detection point of the phase waveform 422 in FIG. 8, e.g., from the time point when the vibration was applied to the zero cross point after passage of the peak point is $t_p$, the distance d between the vibration sensor and the vibration pen can be calculated as follows.

$$d = n \cdot \lambda_p + V_p \cdot t_p \quad (2)$$

where, $\lambda_p$ denotes a wavelength of the elastic wave and n is an integer.

From the equations (1) and (2), the integer n is expressed by $$n = (V_g \cdot t_g - V_p \cdot t_p)/\lambda_p + 1/N \quad (3)$$

N is a real number other than 0 and is set to a proper value. For example, when N=2 and the waveform lies within $\pm \frac{1}{2}$ wavelength, n can be determined.

By substituting the value of n obtained as mentioned above for the equation (2), the distance between the pen 3 and the sensor 6 can be accurately measured.

Figure 9:
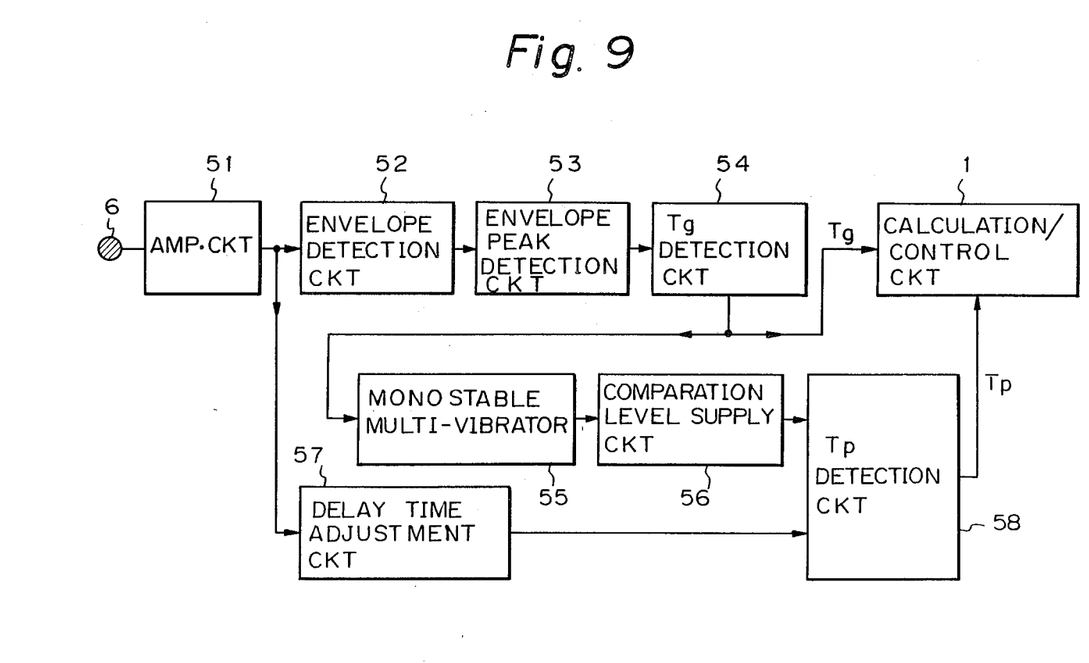
FIG. 9 is a block diagram showing an arrangement of a waveform detection circuit in FIG. 1.

To measure the two vibration propagating times $t_g$ and $t_p$ shown in FIG. 7, the waveform detection circuit 9 can be constituted as shown in, e.g., FIG. 9.

In FIG. 9, the output signal of the vibration sensor 6 is amplified to a predetermined level by an amplifier 51.

The amplified signal is input to an envelope detection circuit 52 and only the envelope of the detection signal is taken out. The timing of the peak of the extracted envelope is detected by an envelope peak detection circuit 53. The peak detection signal is input to a $T_g$ signal detection circuit 54 consisting of a monostable multi-vibrator or the like. Thus, an envelope delay time detection signal $T_g$ of a predetermined waveform is formed by the detection circuit 54 and input to the calculation/control circuit 1.

On the other hand, a phase delay time detection signal $T_p$ is formed be a detection circuit 58 from the timing of the $T_g$ signal and from the original signal delayed by a delay time adjustment circuit 57. The signal $T_p$ is input to the calculation/control circuit 1.

Namely, the $T_g$ signal is converted into pulses of a predetermined width by a monostable multi-vibrator 55. A comparison level supply circuit 56 forms a threshold value to detect the $t_p$ signal in response to the timing for this pulse. Thus, the comparison level supply circuit 56 forms a signal 44 having a level as shown in FIG. 7 and having a timing and supplies to the detection circuit 58.

That is, the monostable multi-vibrator 55 and comparison level supply circuit 56 function in a manner such that the phase delay time is measured only for a predetermined period of time after detection of the envelope peak.

The signal 44 is input to the detection circuit 58 consisting of a comparator or the like and compared with the detection waveform delayed as shown in FIG. 8. Thus, a $t_p$ detection pulse 45 is formed.

The foregoing circuit relates to one of the vibration sensors 6. The same circuit is also provided for each of the other sensors. Assuming that the number of vibration sensors is generally set to h, h detection signals of the envelope delay times $R_{g1}$ to $T_{gh}$ and phase delay times $T_{p1}$ to $T_{ph}$ are input to the calculation/control circuit 1, respectively.

The calculation/control circuit of FIG. 7 receives the detection signals $T_{g1}$ to $T_{gh}$ and $T_{p1}$ to $T_{ph}$ through the input port 15 and takes the count value of the counter 13 into the latch circuit 14 by using each timing as a trigger. As mentioned above, since the counter 13 starts operating synchronously with the driving of the vibration pen 3, the data indicative of the envelope delay time and phase delay time are latched into the latch circuit 14.

Figure 10:
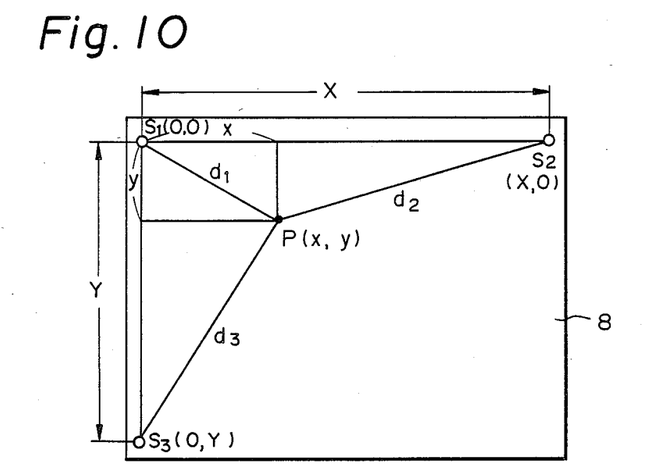
FIG. 10 is an explanatory diagram showing an arrangement of the vibration sensor.

When the three vibration sensors 6 are arranged at corner positions $S_1$ to $S_3$ on the vibration propagating plate 8 as shown in FIG. 10, the straight line distances $d_1$ to $d_3$ from the position P of the vibration pen 3 to the positions of the vibration sensors 6 can be obtained by the processes which have already been described in conjunction with FIG. 8. Further, the coordinates (x, y) of the position P of the vibration pen 3 can be calculated by the calculation/control circuit 1 on the basis of the distances $d_1$ to $d_3$ from the theorem of three squares by the following equations.

$$x = X/2 + (d_1 + d_2)(d_1 + d_2)/2X \quad (4)$$

$$y = Y/2 + (d_1 + d_3)(d_1 - d_3)/2Y \quad (5)$$

X and Y denote distances from the vibration sensors 6 at the positions $S_2$ and $S_3$ to the sensor at the origin (position $S_1$) along the X and Y axes.

The coordinates of the position of the vibration pen 3 can be detected in a real time manner as mentioned above.

As will be obvious from the above description, according to the invention, in a coordinates input apparatus in which the vibration which is input from a vibration pen to a vibration propagating plate is detected by vibration sensors attached to the vibration propagating plate and the coordinates of the vibration input point of the vibration pen are detected, there are provided a member to propagate the vibration generated by a vibrator of the vibration pen to the vibration propagating plate and means for making the vibrator come into contact with the vibration propagating member, wherein a fluid having a high viscosity or consistency is interposed between the vibrator and the vibration propagating member. Therefore, the fluid is filled in the space portion which is formed between the pressure contacting surfaces of the vibrator and vibration propagating member due to the working state or the like. Thus, the pressure contacting states of the vibrator and vibration propagating member are uniformed every product, the vibration can be propagated without a variation, and the vibration waveforms which are applied to the vibration propagating plate can be uniformed. Therefore, there is an excellent advantage such that the coordinates detecting accuracy based on the vibration waveform processes can be remarkably improved.

What is claimed is:

1. A coordinates input apparatus comprising:
   vibration generating means for generating a vibration;
   a vibration propagating member for propagating the vibration generated by said vibration generating means by contacting said vibration generating means;
   a plurality of vibration detecting means each for detecting the vibration propagated by said vibration propagating member and for generating a detection signal;
   a spring member for urging each of said plurality of vibration detecting means into contact with said vibration propagating member through a fluid material with a predetermined viscosity; and
   position coordinates detecting means for detecting position coordinates of said vibration generating means contacting said vibration propagating member on the basis of the detection signal generated by said vibration detecting means.

2. An apparatus according to claim 1, further having display means for displaying the coordinates of the position detected by said position coordinates detecting means.

3. An apparatus according to claim 1, wherein a coefficient of kinematic viscosity of said fluid material of the predetermined viscosity is set to a value within a range from 10,000 to 1,000,000 [centistokes: cSt] (from 0.01 to 1 [m$^2$/sec]).

4. A coordinates input apparatus having vibration generating means for generating a vibration and vibration detecting means for detecting and vibration generated by said vibration generating means and input to a vibration propagating member wherein position coordinates of a vibration detection point are detected,
   wherein said apparatus further comprises a spring member for urging said vibration detecting means into contact with a vibration propagating member through a fluid material having a predetermined viscosity.

5. An apparatus according to claim 4, wherein a coefficient of kinematic viscosity of said fluid material of the predetermined viscosity is set to a value within a range from 10,000 to 1,000,000 [centistokes: cSt] (from 0.01 to 1 [m$^2$/sec]).

6. A coordinates input apparatus having vibration generating means for generating a vibration and vibration detecting means for detecting the vibration generated by said vibration generating means and input to a vibration propagating member wherein position coordinates of a vibration detection point are detected,
   wherein said apparatus further comprises a spring member for urging said vibration generating means into contact with said vibration propagating member through a fluid material having a predetermined viscosity.

7. An apparatus according to claim 6, wherein a coefficient of kinematic viscosity of said fluid material of the predetermined viscosity is set to a value within a range from 10,000 to 1,000,000 [centistokes: cSt] (from 0.01 to 1 [m$^2$/sec]).

* * * * *

UNITED STATES PATENT AND TRADEMARK OFFICE
CERTIFICATE OF CORRECTION

PATENT NO. : 4,887,245

DATED : December 12, 1989

INVENTOR(S) : SHIGEKI MORI ET AL.

It is certified that error appears in the above-identified patent and that said Letters Patent is hereby corrected as shown below:

COLUMN 10

Line 11, "envelope delay times $R_g 1$" should read
--envelope delay times $T_g 1$--.

Line 35, "$x=X/2+(d_1+d_2)(d_1+d_2)/2X \quad (4)$" should read
--$x=X/2+(d_1+d_2)(d_1-d_2)/2X \quad (4)$--.

COLUMN 12

Line 3, "and" should read --the--.

Signed and Sealed this

Twenty-second Day of October, 1991

Attest:

HARRY F. MANBECK, JR.

*Attesting Officer*   *Commissioner of Patents and Trademarks*